(12) United States Patent
Claudatos et al.

(10) Patent No.: US 7,450,937 B1
(45) Date of Patent: Nov. 11, 2008

(54) MIRRORED DATA MESSAGE PROCESSING

(75) Inventors: Christopher H. Claudatos, San Jose, CA (US); William D. Andruss, Minneapolis, MN (US)

(73) Assignee: EMC Corporation, Hopkinton, MA (US)

(*) Notice: Subject to any disclaimer, the term of this patent is extended or adjusted under 35 U.S.C. 154(b) by 500 days.

(21) Appl. No.: 10/936,443

(22) Filed: Sep. 7, 2004

Related U.S. Application Data

(60) Provisional application No. 60/500,725, filed on Sep. 4, 2003.

(51) Int. Cl.
*H04M 3/00* (2006.01)

(52) U.S. Cl. .................. 455/418; 455/446; 455/445; 370/328; 709/206

(58) Field of Classification Search ............... 455/466, 455/445, 418; 370/412, 328; 709/413, 206; 713/185; 340/7.29
See application file for complete search history.

(56) References Cited

U.S. PATENT DOCUMENTS

| | | | |
|---|---|---|---|
| 5,416,831 A | 5/1995 | Chewning et al. | |
| 5,432,845 A | 7/1995 | Burd et al. | |
| 5,796,948 A | 8/1998 | Cohen | |
| 5,890,163 A | 3/1999 | Todd | |
| 6,064,963 A | 5/2000 | Gainsboro | |
| 6,085,231 A | 7/2000 | Agraharam et al. | |
| 6,128,739 A | 10/2000 | Fleming, III | |
| 6,311,055 B1 | 10/2001 | Boltz | |
| 6,313,734 B1* | 11/2001 | Weiss et al. ............... 340/7.29 | |
| 6,327,343 B1 | 12/2001 | Epstein et al. | |
| 6,442,595 B1 | 8/2002 | Kelly | |
| 6,442,686 B1 | 8/2002 | McArdle et al. | |
| 6,522,727 B1 | 2/2003 | Jones | |
| 6,609,138 B1 | 8/2003 | Merriam | |
| 6,643,684 B1 | 11/2003 | Malkin et al. | |
| 6,714,791 B2 | 3/2004 | Friedman | |
| 6,721,785 B1 | 4/2004 | Raghunandan | |
| 6,765,996 B2 | 7/2004 | Baxter, Jr. | |
| 6,779,022 B1* | 8/2004 | Horstmann et al. ......... 709/206 |
| 6,785,704 B1 | 8/2004 | McCanne | |
| 6,826,609 B1 | 11/2004 | Smith et al. | |
| 6,868,498 B1 | 3/2005 | Katsikas | |
| 7,020,779 B1* | 3/2006 | Sutherland ................ 713/185 |
| 7,031,437 B1* | 4/2006 | Parsons et al. ........... 379/88.12 |
| 7,106,850 B2 | 9/2006 | Campbell et al. | |
| 2002/0107950 A1 | 8/2002 | Lu | |

(Continued)

FOREIGN PATENT DOCUMENTS

WO  WO 01/76181  10/2001

OTHER PUBLICATIONS

U.S. Appl. No. 10/936,439, filed Sep. 7, 2004, Claudatos et al.

(Continued)

*Primary Examiner*—Danh C Le
(74) *Attorney, Agent, or Firm*—Van Pelt, Yi & James LLP

(57) ABSTRACT

Processing mirrored mobile data messages is disclosed. A mirrored copy of a mobile data message is received at a receiving location other than an intended recipient associated with the data message. The mirrored copy of the mobile data message is processed as required by a communication policy associated with the mobile data message.

34 Claims, 6 Drawing Sheets

U.S. PATENT DOCUMENTS

| | | | |
|---|---|---|---|
| 2002/0147734 | A1 | 10/2002 | Shoup et al. |
| 2003/0032409 | A1 | 2/2003 | Hutcheson et al. |
| 2004/0153499 | A1 | 8/2004 | Burd et al. |
| 2004/0176080 | A1 | 9/2004 | Chakravorty et al. |
| 2004/0244102 | A1 | 12/2004 | Benzon et al. |
| 2004/0259534 | A1 | 12/2004 | Chaudhari et al. |
| 2005/0031107 | A1 | 2/2005 | Fotta |
| 2005/0053084 | A1* | 3/2005 | Abrol et al. .................. 370/412 |
| 2006/0148495 | A1* | 7/2006 | Wilson ....................... 455/466 |
| 2006/0168003 | A1* | 7/2006 | Vau et al. ................... 709/206 |

OTHER PUBLICATIONS

U.S. Appl. No. 10/936,443, filed Sep. 7, 2004, Claudatos et al.
U.S. Appl. No. 10/936,442, filed Sep. 7, 2004, Claudatos et al.
U.S. Appl. No. 11/173,949, filed Jun. 30, 2005, Claudatos et al.
U.S. Appl. No. 10/884,453, filed Jul. 1, 2004, Claudatos et al.
U.S. Appl. No. 10/884,477, filed Jul. 1, 2004, Claudatos et al.
U.S. Appl. No. 10/884,345, filed Jul. 1, 2004, Claudatos et al.
U.S. Appl. No. 10/884,473, filed Jul. 1, 2004, Claudatos et al.
U.S. Appl. No. 60/500,453, filed Sep. 5, 2003, Claudatos.
"Method for Preclude Unauthorized Sending or Forwarding of Mail Items" IBM Technical Disclosure Bulletin, IBM Corp. New York, US, vol. 37, No. 3, Mar. 1, 1994, p. 199, XP000441437, ISSN: 0018-8689.
Legato, Email Management Solutions, TheEmailXtender Family, 2004, http://www.legato.com/products/emailxtender/.
Legato, EmailXtender Archive Edition, Email Archiving Software,2004, http://www.legato.com/products/emailxtender/emailarchive.cfm.
Legato, EmailXaminer, Email Monitoring Software, EmailXaminer the Email Compliance Manager, 2004, http://www.legato.com/products/emailxtender/emailxaminer.cfm.
EMMA™ E-Mail Monitoring Archive, 2004, http://elstore.com/emmamain.html.

* cited by examiner

MIRRORED DATA MESSAGE PROCESSING

CROSS REFERENCE TO OTHER APPLICATIONS

This application claims priority to U.S. Provisional Patent Application No. 60/500,725 entitled SMS MESSAGE PROCESSING filed Sep. 4, 2003 which is incorporated herein by reference for all purposes.

Co-pending U.S. patent application Ser. No. 10/936,439 entitled DATA MESSAGE MIRRORING AND REDIRECTION filed concurrently herewith is incorporated herein by reference for all purposes; and co-pending U.S. patent application Ser. No. 10/936,442 entitled DATA MESSAGE PROCESSING filed concurrently herewith is incorporated herein by reference for all purposes.

FIELD OF THE INVENTION

The present invention relates generally to processing data messages. More specifically, mirrored data message processing is disclosed.

BACKGROUND OF THE INVENTION

In many contexts, an enterprise or other stakeholder may be required and/or may desire to keep track of and/or exercise control over network or other communications, e.g., communications among employees of a corporation and/or between such employees and third parties, such as the corporation's customers and/or members of the general public. The requirements of the Securities and Exchange Commission, National Association of Securities Dealers, HIPAA, Sarbanes-Oxley Act of 2002, and various anti-harassment and anti-discrimination laws are among the many legal and regulatory requirements that may give rise to a need on the part of a corporation or other entity to be able to monitor, record, archive, index, retrieve, analyze, and/or control employee (or other user) communications.

The task of monitoring and controlling communications is made more challenging by the proliferation in recent years of communication technologies, such as chat, instant messaging, and short message service (SMS) technology (the basic text character form of which is sometimes referred to as "text messaging", e.g., via a mobile phone or other mobile device), and technologies related to SMS such as Enhanced Message Service (EMS) and Multimedia Message Service (MMS), which enable longer messages and rich, multimedia content such as video to be sent. Data messaging technologies that use a mobile network, such as SMS and other mobile network-based messaging technologies, can present a particular challenge, because the equipment used to receive, process, and deliver a message may depend on the geographic location of the user at the time the user sends the message. As a result, in a typical prior art mobile network it is not uncommon for mobile data messages to be delivered via a communication path that does not include any equipment through which the mobile data message transits and/or on which a copy of the mobile data message persists such as may be suitable and/or convenient to enable a communication policy to be applied to the mobile data message.

Furthermore, some data messaging technologies use available bandwidth on a communication channel to opportunistically transmit data messages, e.g., at times when the communication channel is not busy transferring data associated with a primary type of communication for which the communication channel primarily is used. For example, mobile telephones and associated service provider infrastructure are used, or at least were provided originally, primarily to support full duplex voice communication between two or more stations, at least one of them being (or being capable of being) mobile (e.g., wireless). SMS messaging and related technologies opportunistically use available bandwidth on mobile communication channels to allow users to send and/or receive secondary data messages, such as text messages. Such secondary messages may be stored by a service provider until an opportunity arises to forward them to their intended recipient, e.g., once the recipient comes into range of an element of the mobile network and/or turns their mobile equipment on. Even if a way were provided to archive, monitor, and/or control the primary type of communications on such networks, the approach used for the primary type of communication may not be suitable for performing such functions with respect to the secondary data messaging traffic. Also, different rules may apply to the different types of communication, e.g., to the extent the secondary data communication is considered to be a communication "in writing" and/or may be more likely to persist, be forwarded, etc.

Therefore, there is a need for an effective way to monitor and/or control communications via data messages, including without limitation communications made using mobile and/or secondary data messaging technology.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Processing mirrored data messages is disclosed. In one embodiment, a copy of a data message is received. Compliance processing is performed on the data message to the extent required by a data message communication policy. In one embodiment, the data message comprises a mobile data message delivered at least in part by a mobile communication network. In one embodiment, the data message comprises a secondary data message delivered at least in part by opportunistically transmitting the data message through a communication channel designed at least initially to support a primary communication of a different type than the secondary data message. In one embodiment, metadata is extracted from the data message and the data message and associated metadata are stored. In one embodiment, a rule is applied to determine whether the data message complies with a policy.

Figure 1:
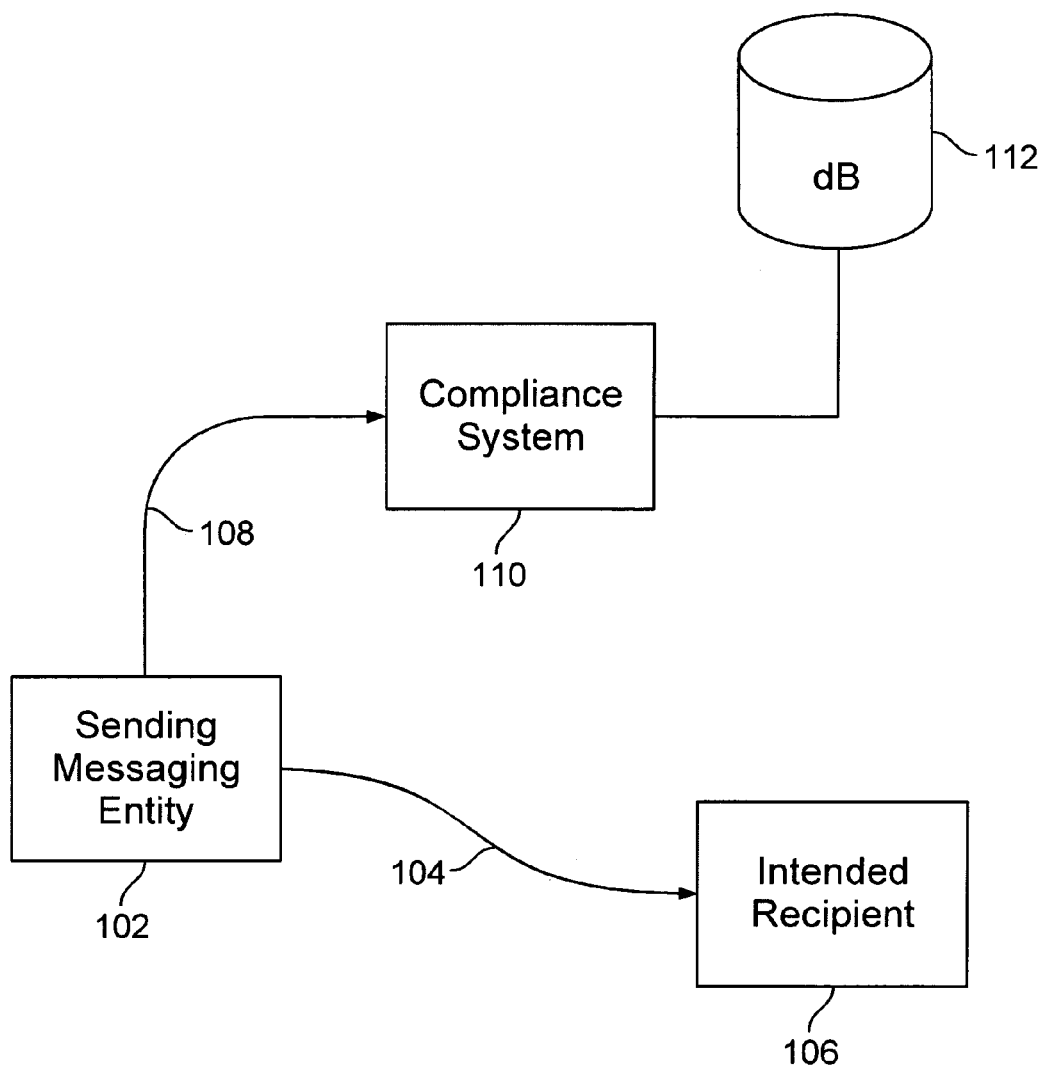
FIG. 1 is a block diagram illustrating data message mirroring as implemented in one embodiment.

FIG. 1 is a block diagram illustrating data message mirroring as implemented in one embodiment. A sending messaging entity (SME) 102 generates and sends a data message via communication path 104 to an intended recipient 106. The SME 102 sends a copy of the data message via communication path 108 to a compliance system 110. In one embodiment, the SME 102 sends a copy of the data message to compliance system 110 by encapsulating a copy of the message and sending the encapsulated copy to compliance system 110. Compliance system 110 is configured to process the copy of the data message in accordance with a policy. In one embodiment, compliance system 110 comprises a processor configured to process mirrored data messages as described herein. Compliance system 110 is connected to a database 112, which in one embodiment is used to store at least selected data messages and/or associated metadata. In one embodiment, compliance system 110 and database 112 reside on the same computer system. In one embodiment, the SME 102 comprises a mobile communication device, such as a mobile telephone or a personal digital assistant or other device configured to send data messages via a wireless network. In one embodiment, the SME 102 comprises a wireless communication device. In one embodiment, SME 102 comprises a non-mobile (e.g., wired or stationary wireless) device configured to send data messages via a path that comprises at least in part elements of a mobile or wireless communication infrastructure.

In one embodiment, the message to the intended recipient may be a mobile data message. The term "mobile data message" as used herein refers to any data message transmitted at least in part via a mobile or wireless communication network, and specifically includes such messages even though they originate from and/or terminate at a non-mobile and/or non-wireless equipment. The term "mobile network" is used herein to refer to a communication network in which one or more sending and/or receiving nodes may connect to the network from more than one physical location (e.g., from two or more different geographic locations). The term "wireless network" as used herein refers to a communication network in which one or more sending and/or receiving nodes may connect to the network via wireless communication. Typically, a wireless network is also a mobile network because at least in theory a node configured to communicate via wireless communication can be moved to a different physical location and still access the wireless network. Except as specified, a wireless network may be substituted for a mobile network in embodiments described herein and vice versa.

In one embodiment, the data message comprises a secondary data message. As used herein, the term "secondary data message" refers to a data message of a type that is different than a primary type of communication for which at least a portion of the communication path used to transmit the secondary data message was at least initially designed and/or intended, which secondary data message is transmitted opportunistically using communication channel bandwidth that is not being used at a given time to transmit a communication of the primary type. An SMS or similar message (e.g., text message) sent to or from mobile/wireless telephones is an example of a "secondary data message" as that term is used herein.

In one embodiment, the communication path 108 may include at least a portion that is part of the same communication network as at least a portion of communication path 104. For example, if the message to the intended recipient is an SMS text message, in one embodiment the communication by which a copy of the SMS text message may itself comprise an SMS text message sent to compliance system 110. In other embodiments, the communication sent to compliance system 110 may be a communication of a different type than the original message, e.g., an electronic mail message, sent at least in part via the same communication network used to send the original SMS text message, e.g., by sending the copy to a gateway or mail server configured to receive electronic mail messages via the wireless network used to transmit the original SMS message and deliver them to a compliance system via an e-mail account associated with the compliance system.

In one embodiment, the SME 102 first sends the data message to the intended recipient 106 and then sends a copy of the data message to the compliance system 110. In one embodiment, the SME 102 first sends a copy of the data message to the compliance system 110 and then sends the data message to the intended recipient 106. In one embodiment, the SME 102 first sends a copy of the data message to the compliance system 110 and sends the data message to the intended recipient 106 only after confirmation has been received from the compliance system 110 that the copy was received.

Figure 2:
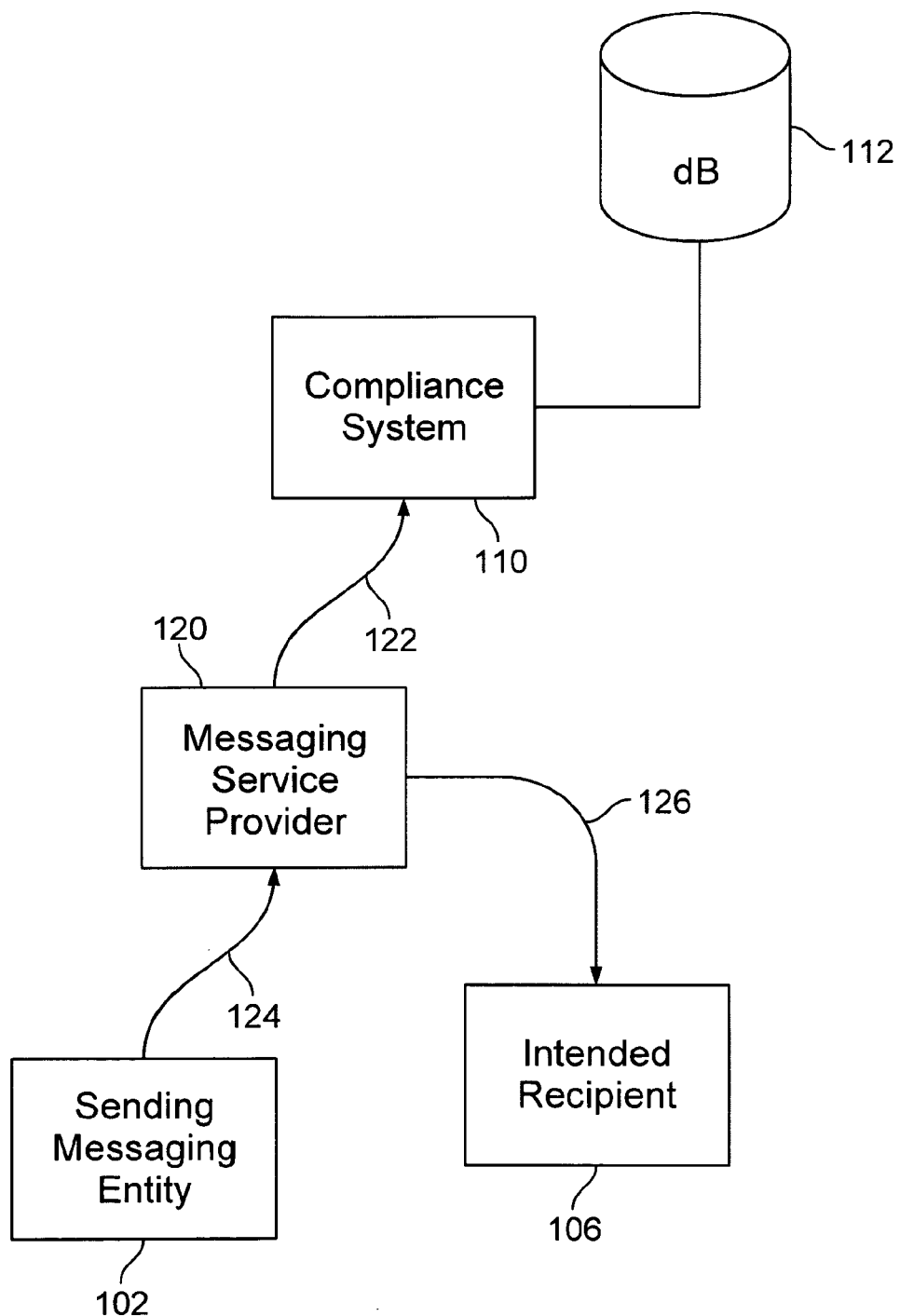
FIG. 2 is a block diagram illustrating data message mirroring as implemented in one embodiment.

FIG. 2 is a block diagram illustrating data message mirroring as implemented in one embodiment. In this example, the SME 102 sends to a messaging service provider 120 a data message addressed to intended recipient 106. The messaging service provider then delivers the data message to the intended recipient 106 and sends a copy of the data message to compliance system 110. In one embodiment, the messaging service provider 120 sends a copy of only selected data messages sent by SME 102 to compliance system 110 and is configured to apply one or more rules to each data message received from SME 102 to determine if a copy of a particular message is to be sent to compliance system 110. The communication path 122 used by the messaging service provider 120 to send a copy of the data message to compliance system 110 may include portions of the same and/or different communication networks than the communication path 124 used by the SME 102 to send the data message to messaging service provider 120 and/or the communication path 126 used by messaging service provider 120 to deliver the data message to intended recipient 106.

Figure 3:
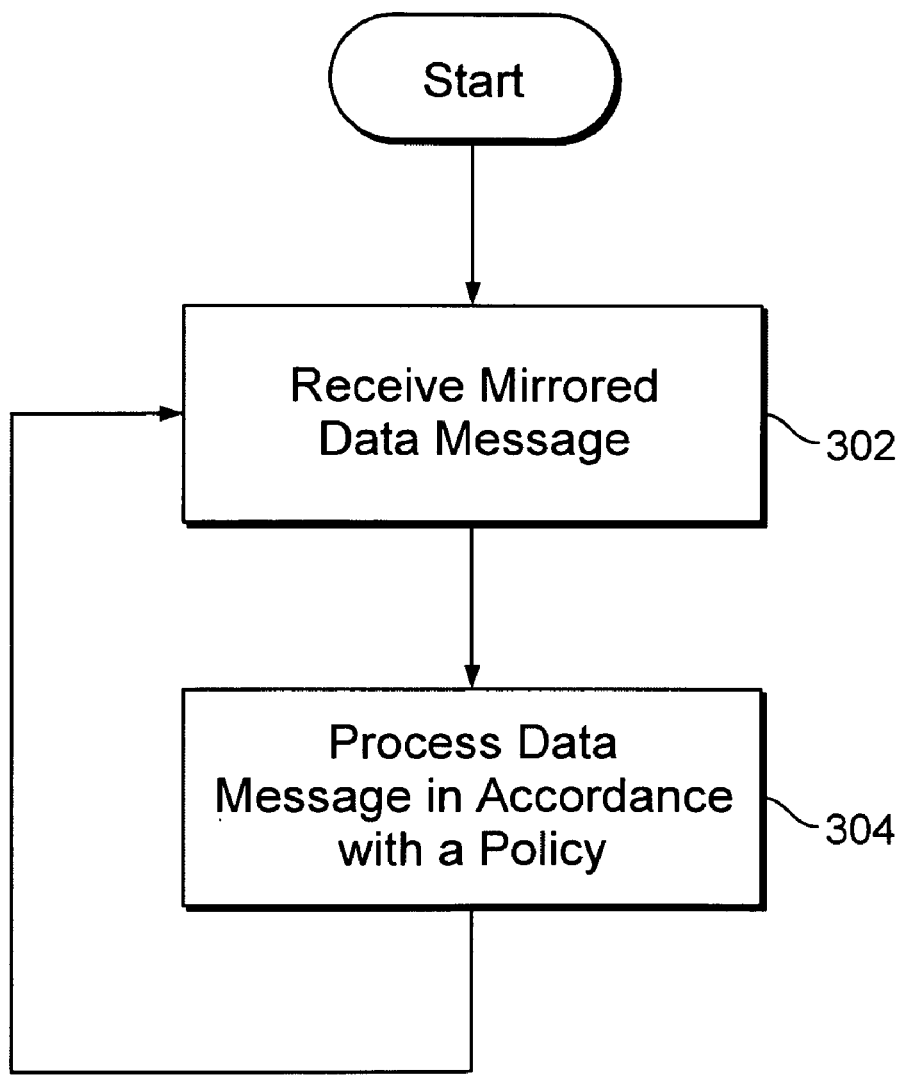
FIG. 3 is a flow chart illustrating a process used in one embodiment to process a mirrored data message.

FIG. 3 is a flow chart illustrating a process used in one embodiment to process a mirrored data message. In one embodiment, the process of FIG. 3 is implemented on a compliance system configured to receive a mirrored copy of a data message, such as compliance system 110 of FIGS. 1 and 2. A mirrored data message is received (302). The term "mirrored data message" as used herein refers to a copy of a data message sent to a destination other than the intended recipient of the original data message. The mirrored data message is processed in accordance with a policy (304). Thereafter, the process is repeated each time a mirrored data message is received.

Figure 4:
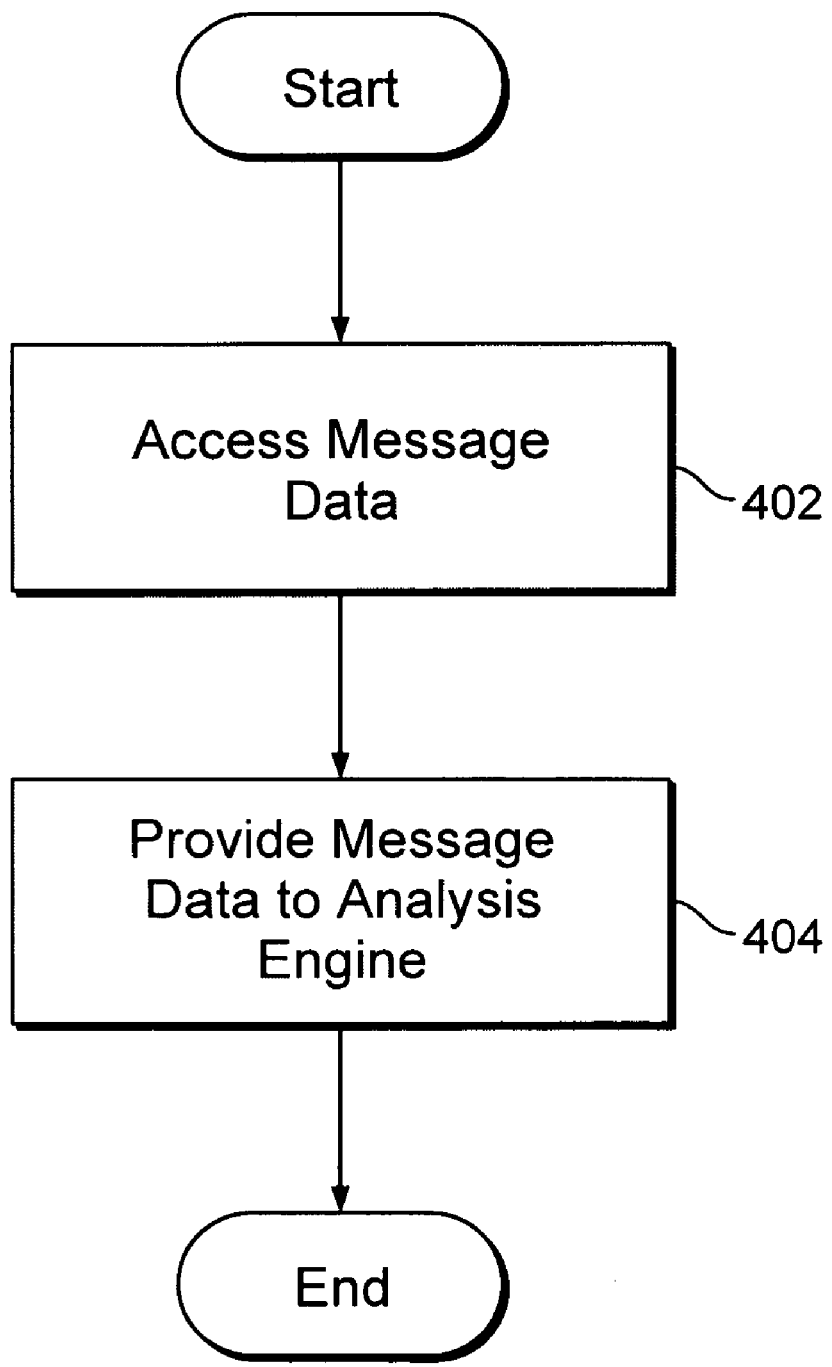
FIG. 4 is a flow chart illustrating a process used in one embodiment to receive a mirrored data message.

FIG. 4 is a flow chart illustrating a process used in one embodiment to receive a mirrored data message. In one embodiment, the process of FIG. 4 is used to implement 302 of FIG. 3. Message data associated with the received mirrored data message is accessed (402). In one embodiment, the mirrored data message is received as an encapsulated copy of the data message, and accessing the message data includes removing the encapsulation, e.g., by removing an encapsulation header. In one embodiment, the mirrored data message is received as an attachment to a forwarding communication used to forward the copy as an attachment, such as an e-mail message, and in such an embodiment accessing the message data includes opening the attachment. In one embodiment, the message data may be in a format other than the one desired or required to be used for processing, and in such an embodiment accessing the message data includes reformatting the message data, such as by parsing the data and/or converting the data to another format, such as extensible markup language (xml) format. The message data is provided to an analysis engine for processing (404).

Figure 5:
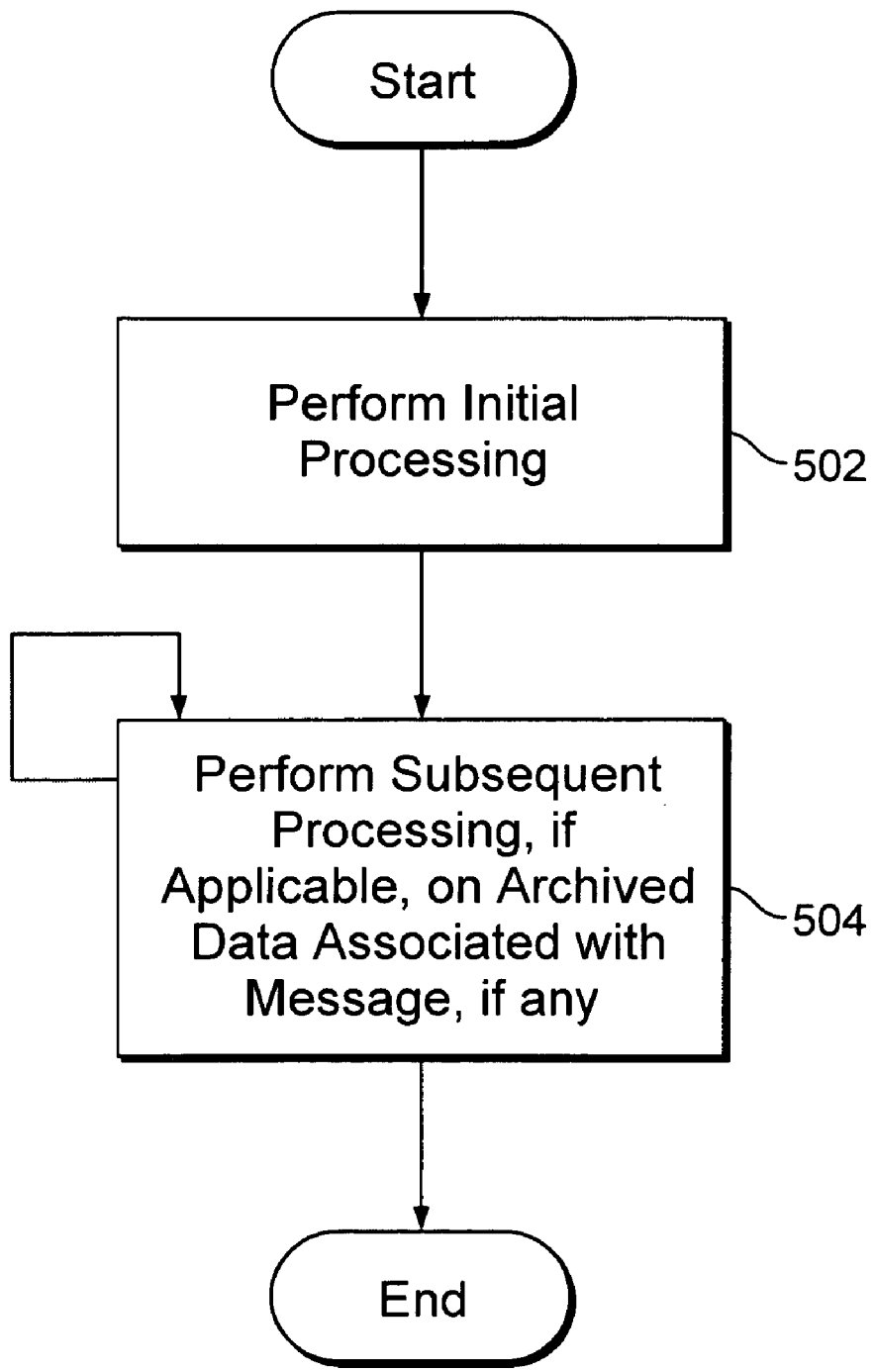
FIG. 5 is a flow chart illustrating a process used in one embodiment to process a mirrored data message in accordance with a policy.

FIG. 5 is a flow chart illustrating a process used in one embodiment to process a mirrored data message in accordance with a policy. In one embodiment, the process of FIG. 5 is used to implement 304 of FIG. 3. Initial processing is performed on the mirrored data message (502). The initial processing may include extracting metadata associated with the message, storing data associated with the message, updating a statistic based on data associated with the message, determining whether the message violates a policy, and/or other processing, as described more fully below in connection with FIG. 6. If data associated with the message is stored in an archive, subsequent processing may be performed on such data, if applicable (e.g., if required or requested) (504). In one embodiment, such subsequent processing may include processing such stored data to implement a data retention policy, such as by ensuring the data is retained for a required retention period and/or deleted after the retention period has expired. In one embodiment, the retention rule to be applied is determined at least in part on an analysis of data associated with the data message, such as metadata associated with the data message, message content data associated with the message, or both. In one embodiment, the subsequent processing may include processing in support of audits, investigations, research, and/or system, equipment, and/or network utilization studies to which the data message may be relevant.

Figure 6:
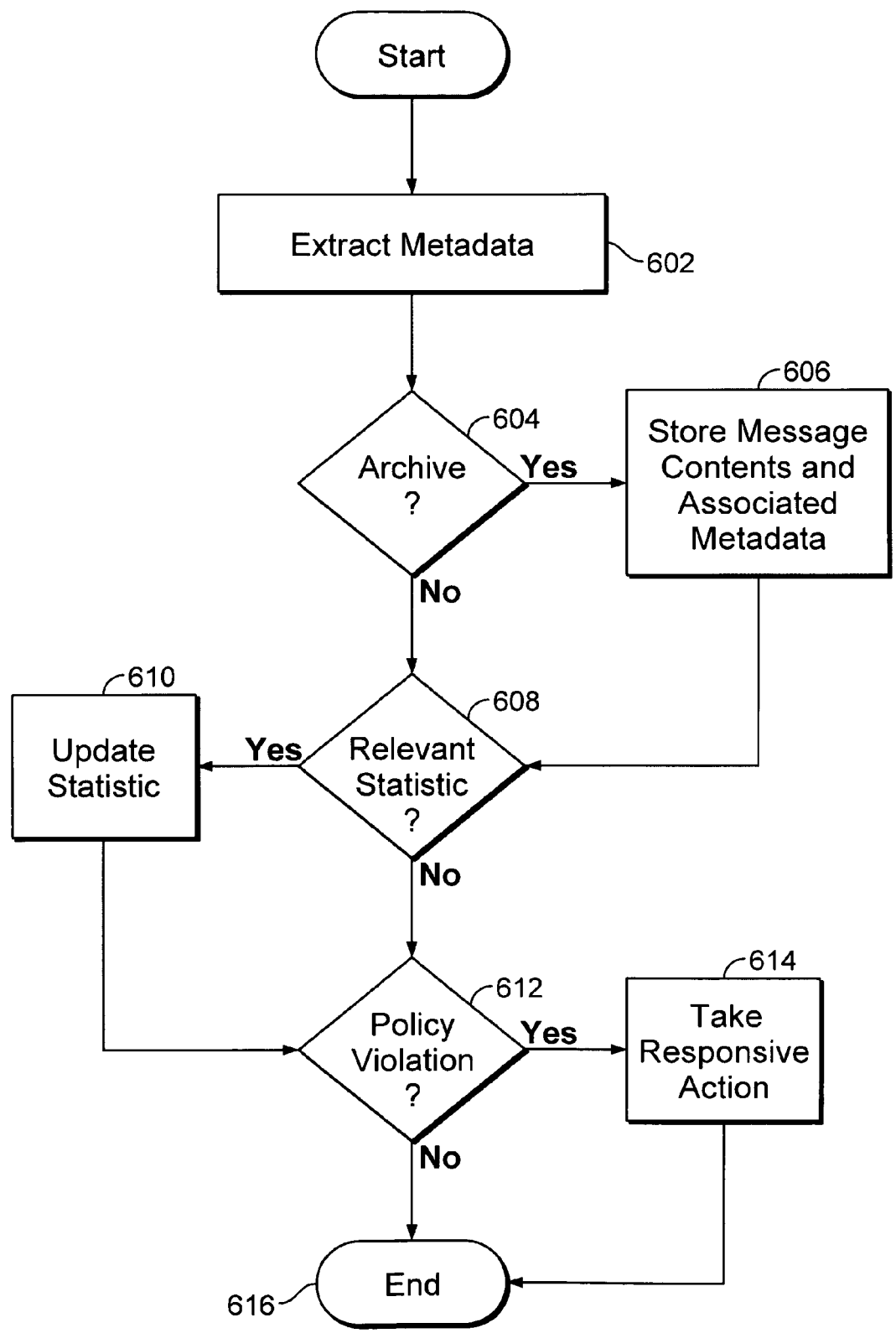
FIG. 6 is a flow chart illustrating a process used in one embodiment to perform initial processing on a mirrored data message.

FIG. 6 is a flow chart illustrating a process used in one embodiment to perform initial processing on a mirrored data message. In one embodiment, the process of FIG. 6 is used to implement 502 of FIG. 5. Metadata is extracted from message data associated with the data message (602). In one embodiment, metadata is extracted from a header portion of the data message, e.g., source and destination address information, subject line, sending protocol specific information, etc. In one embodiment, metadata is extracted by processing message content data associated with the message. In one embodiment, natural language and/or other processing techniques are used to extract metadata from the content of the data message, such as by identifying keywords or creating an index, summary, synopsis, and/or other representation of the contents. In one embodiment, metadata is extracted by classifying the message contents by type of data (e.g., text, video, voice, audio, etc.). It is determined whether data associated with the message is required to be archived (604). In one embodiment, the determination whether to archive a message is based at least in part on metadata extracted in 602. In one embodiment, the determination whether to archive a message is based at least in part on the contents of the message and/or the results of an analysis thereof. In one embodiment, a policy or rule may be applied to metadata and/or content associated with a message to determine whether the message is required to be archived. In one alternative embodiment, all messages are archived and 604 is omitted from the process shown in FIG. 6. If the message is required to be archived, the message contents and associated metadata are stored (606). It is determined whether a relevant statistic is required to be updated to reflect the data message (608). In one embodiment, metadata and/or message contents data associated with the data message is/are processed to determine whether a statistic is required to be updated to reflect the data message. If a statistic is required to be updated, the statistic is updated to reflect the data message (610). It is determined whether the data message violates a policy (612). In one embodiment, metadata associated with the data message, message contents data associated with the data message, and/or a combination of the two are processed to determine if the data message violates a policy. For example, a data message sent to a destination to which the sender is not authorized to communicate using a data message of the type being processed, e.g., per a policy of a corporate or other enterprise with which the sender is associated, may be determined based on metadata (e.g., destination address information, or sender-destination pair information) associated with the message. As another example, a data message containing proscribed content, such as obscene, harassing, or discriminatory content, may be determined to violate a policy proscribing communications containing such content based on an analysis of message content data. As a further example, a data message may be determined to violate a policy proscribing the sending of content that is permitted to be sent to certain destinations but not others, such as one permitting confidential business information to be sent among employees of a business but not to third parties, based on a combination of metadata (i.e., the destination address) and message contents data (i.e., the confidential business information). If it is determined that a data message violates a policy, responsive action is taken (614). In one embodiment the responsive action may include sending a notice to the sender, the sender's supervisor, and/or a communication policy compliance administrator or other authorized person. In one embodiment, the responsive action may include logging information associated with the data message. After such responsive action is taken, or if no violation is found, the process ends (616).

In one embodiment, incoming data messages addressed to a particular destination, e.g., one of a group of destinations associated with a set of communication equipment and/or other resources, are mirrored to a compliance system and processed as described above.

Using the approaches described herein, effective archiving, tracking, monitoring, and analysis of data messages, including without limitation mobile data messages and secondary data messages, can be achieved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of processing mirrored mobile data messages, comprising:
   receiving a mirrored copy of a mobile data message at a receiving location other than an intended recipient associated with the data message and a sender associated with the data message, wherein a first path via which the mirrored copy is sent to the receiving location diverges from a second path associated with sending the mobile data message being mirrored from the sender to the intended recipient; and
   processing the copy of the mobile data message as required by a communication policy associated with the mobile data message, wherein said communication policy requires that mobile data messages that meet a prescribed criterion be archived and said processing comprises determining whether the mobile data message satisfies the criterion and storing data associated with the mobile data message based at least in part on the determination whether the mobile data message satisfies the criterion.

2. A method as recited in claim 1, wherein said processing comprises storing data associated with the mobile data message.

3. A method as recited in claim 1, wherein said processing comprises storing metadata associated with the mobile data message.

4. A method as recited in claim 1, wherein said processing comprises storing all or part of the contents of the mobile data message.

5. A method as recited in claim 1, wherein said processing includes storing data associated with the mobile data message and processing said stored data to implement a data retention policy.

6. A method as recited in claim 1, wherein said processing comprises analysis of data associated with the data message and the data message itself for the development, at least in part, of a data retention rule that is to be applied to stored data associated with the data message.

7. A method as recited in claim 1, wherein said processing comprises determining whether to archive data associated with the mobile data message.

8. A method as recited in claim 1, wherein said processing comprises updating a statistic based at least in part on the mobile data message.

9. A method as recited in claim 1, wherein said processing comprises determining whether the mobile data message violates said communication policy.

10. A method as recited in claim 1, wherein said processing comprises determining based at least in part on metadata associated with the mobile data message whether the mobile data message violates said communication policy.

11. A method as recited in claim 1, wherein said processing comprises determining based at least in part on at least a portion of the contents of the mobile data message whether the mobile data message violates said communication policy.

12. A method as recited in claim 1, wherein said processing comprises determining whether the mobile data message violates said communication policy and taking responsive action if it is determined that the mobile data message violates said communication policy.

13. A method as recited in claim 12, wherein the responsive action comprises sending a notification.

14. A method as recited in claim 12, wherein the responsive action comprises logging information associated with the mobile data message.

15. A method as recited in claim 1, wherein said processing comprises storing in a persistent memory data associated with the mobile data message and processing at least a portion of said stored data to apply a retention policy to the stored data.

16. A method as recited in claim 1, wherein said processing comprises storing in a persistent memory data comprising at least a portion of the content of the mobile data message and applying a retention policy to the stored data based at least in part on an analysis of the stored at least a portion of the content.

17. A method as recited in claim 1, wherein the mirrored copy of the mobile data message is received at substantially the same time as it was sent to the intended recipient by the sender that originated the mobile data message.

18. A method as recited in claim 1, wherein the mirrored copy of the mobile data message is received at substantially the same time as it was delivered to the intended recipient.

19. A method as recited in claim 1, wherein the mobile data message is originated by a wireless equipment.

20. A method as recited in claim 1, wherein the intended recipient comprises a wireless equipment.

21. A method as recited in claim 1, wherein the mobile data message is sent to the intended recipient via a communication path at least a portion of which comprises a mobile network.

22. A method as recited in claim 1, wherein the mobile data message is sent to the intended recipient via a communication path at least a portion of which comprises a wireless network.

23. A method as recited in claim 1, wherein the mobile data message comprises a secondary data message sent opportunistically via a communication path intended at least originally to be used to transmit a primary type of communication other than communications such as the secondary data message.

24. A method as recited in claim 1, wherein the mirrored copy is sent by a sending messaging entity that sent the original mobile data message.

25. A method as recited in claim 1, wherein the mirrored copy is sent by a messaging service provider to which the sender of the mobile data message sent the mobile data message for delivery to the intended recipient.

26. A method as recited in claim 1, wherein receiving the mirrored copy comprises receiving an encapsulated copy of the mobile data message and removing the encapsulation.

27. A method as recited in claim 1, wherein receiving the mirrored copy comprises receiving a copy of the mobile data message as an attachment to a received forwarding message and opening the attachment.

28. A method as recited in claim 1, wherein the mobile data message is associated with the sender to which the policy applies.

29. A method as recited in claim 1, wherein the mobile data message is mirrored because the policy applies to the intended recipient.

30. A method as recited in claim 1, wherein the mobile data message is selected for mirroring because it comprises a reply to a prior mobile data message to which the policy applies.

31. A method as recited in claim 1, wherein the communication policy is associated with offensive content.

32. A method as recited in claim 1, wherein the communication policy is associated with sensitive information.

33. A system configured to process mirrored mobile data messages, comprising:
   a processor configured to:
   receive a mirrored copy of a mobile data message at a receiving location other than an intended recipient associated with the data message and a sender associated with the data message, wherein a first path via which the mirrored copy is sent to the receiving location diverges from a second path associated with sending the mobile data message being mirrored from the sender to the intended recipient; and process the copy of the mobile data message as required by a communication policy associated with the mobile data message, wherein said communication policy requires that mobile data messages that meet a prescribed criterion be archived and said processing comprises determining whether the mobile data message satisfies the criterion and storing data associated with the mobile data message based at least in part on the determination whether the mobile data message satisfies the criterion; and a memory configured to store, under the control of said processor, data associated with the mobile data message.

34. A computer program product for processing mirrored mobile data messages, the computer program product being embodied in a computer readable medium and comprising computer instructions for:

receiving a mirrored copy of a mobile data message at a receiving location other than an intended recipient associated with the data message and a sender associated with the data message, wherein a first path via which the mirrored copy is sent to the receiving location diverges from a second path associated with sending the mobile data message being mirrored from the sender to the intended recipient; and processing the copy of the mobile data message as required by a communication policy associated with the mobile data message, wherein said communication policy requires that mobile data messages that meet a prescribed criterion be archived and said processing comprises determining whether the mobile data message satisfies the criterion and storing data associated with the mobile data message based at least in part on the determination whether the mobile data message satisfies the criterion.

\* \* \* \* \*